United States Patent [19]
Tomita

[11] Patent Number: 4,569,035
[45] Date of Patent: Feb. 4, 1986

[54] MAGNETO-OPTICAL INFORMATION READING APPARATUS

[75] Inventor: Yasuo Tomita, Yokohama, Japan
[73] Assignee: Canon Kabushiki Kaisha, Tokyo, Japan
[21] Appl. No.: 529,716
[22] Filed: Sep. 6, 1983
[30] Foreign Application Priority Data Sep. 16, 1982 [JP]  Japan .................................. 57-162028

[51] Int. Cl.$^4$ .............................................. G11C 13/06
[52] U.S. Cl. ..................................................... 365/122
[58] Field of Search ................ 365/122; 350/374, 375; 250/570

[56] References Cited
PUBLICATIONS

IEEE Transactions on Magnetics–Dec. 1969, pp. 700–716.

*Primary Examiner*—James W. Moffitt
*Attorney, Agent, or Firm*—Fitzpatrick, Cella, Harper & Scinto

[57] ABSTRACT

This specification discloses a magneto-optical information reading apparatus which comprises a device for causing a light beam polarized in a predetermined direction to enter a magnetic recording medium on which information is recorded, an analyzer provided in the optical path of the light beam modulated by the magneto-optic effect in accordance with the information, and a photodetector having the current amplifying function and photoelectrically detecting the light beam transmitted through the analyzer, and in which the following equation is substantially satisfied:

$$\phi = \pm\sin^{-1}\left(\frac{1}{\sqrt{1+\sqrt{\eta}}}\right),$$

where $\phi$ is the transmission axis azimuth of the analyzer relative to the predetermined direction of polarization and $\eta$ is the extinction factor of the analyzer.

8 Claims, 8 Drawing Figures

MAGNETO-OPTICAL INFORMATION READING APPARATUS

BACKGROUND OF THE INVENTION

1. Field of the Invention

This invention relates to a magnetically recorded information reading apparatus utilizing the magneto-optic effect.

2. Description of the Prior Art

A method of optical reading out of magnetically recorded information by the use of the magneto-optic Kerr effect is known. An optical system as shown in FIG. 1 of the accompanying drawings is generally used for electrical detection of such recorded information.

In FIG. 1, an incident light beam 1 emitted from a light source (not shown) such as a laser and collimated is made into a linearly polarized light by a polarizing plate 2 and passes through a half mirror 3 and a condenser lens 4 to a perpendicular magnetic recording medium 5 on which information is recorded as a variation in direction of magnetization. The reflected light beam 1' reflected by the perpendicular magnetic recording medium 5 corresponds to the direction of magnetization (upward or downward) of the perpendicular magnetic recording medium 5 and the plane of polarization of the light beam is subjected to rotations in opposite directions by the Kerr effect and reflected as an elliptically polarized light. For example, if the plane of polarization of the light beam reflected by the downwardly magnetized portion is subjected to a rotation of $\theta_K$, the plane of polarization of the light beam reflected by the upwardly magnetized portion is subjected to a rotation of $-\theta_K$. This reflected light beam 1' again passes through the condenser lens 4 and the half mirror 3 and is transmitted through an analyzer 6. The reflected light beam 1' containing the information recorded on the recording medium 5 as the rotation of the plane of polarization is subjected to a variation in quantity corresponding to said information by the analyzer 6. Further, this light beam passes through a lens 7 and is photoelectrically converted by a photodetector 8, and said information is read.

The angle of rotation $\theta_K$ of the plane of polarization by the Kerr effect is usually substantially 1° or less, and considering that the Kerr rotation modulated component obtained by passing through the analyzer 6 is of a very minute amount, it is necessary that the azimuth (azimuth angle) of the analyzer 6 be set to such an optimum position that the SN ratio of the detection signal is maximum.

Thus, in the magneto-optical information reading apparatus according to the prior art, the azimuth of the analyzer 6 has usually been set to 45° relative to the direction of polarization of the incident light beam to maximize the magnitude of the detection signal. However, the influence of noise superposed on the detection signal differs depending on the characteristic of a detecting system (a photodetector and an amplifier) and, taking such noise into account, a maximum SN ratio cannot always be obtained at the azimuth of 45°. That is, in a photodetector having no current amplifying function, such as a PIN-photodiode, heat noise having no dependence on the azimuth of the analyzer is dominant, while in a photodetector having the current amplifying function advantageous in respect of the SN ratio (for example, a photomultiplier tube or an avalanche photodiode (ADD)), shot noise in which the average noise power is proportional to the quantity of light detected is dominant and, due to the fact that the shot noise has dependence on the extinction factor and azimuth of the analyzer, a maximum SN ratio has not been obtained when a photodetector having the current amplifying function is used in the conventional magneto-optical information reading apparatus wherein the transmission axis azimuth of the analyzer is 45°.

SUMMARY OF THE INVENTION

It is an object of the present invention to provide a magneto-optical information reading apparatus in which reproduction of a maximum SN ratio is possible when use is made of a photodetector having the current amplifying function.

The above object is achieved by a magneto-optical information reading apparatus which comprises means for causing a light beam polarized in a predetermined direction to enter a magnetic recording medium on which information is recorded, an analyzer provided in the optical path of the light beam modulated by the magneto-optic effect in accordance with said information, and a photodetector having the current amplifying function and photoelectrically detecting the light beam transmitted through the analyzer and in which the following equation is substantially satisfied:

$$\phi = \pm \sin^{-1}\left(\frac{1}{\sqrt{1+\sqrt{\eta}}}\right),$$

where $\phi$ is the transmission axis azimuth of the analyzer relative to the predetermined direction of polarization and $\eta$ is the extinction factor of the analyzer.

The invention will become more fully apparent from the following detailed description thereof taken in conjunction with the accompanying drawings.

DESCRIPTION OF THE PREFERRED EMBODIMENTS

Figure 1:
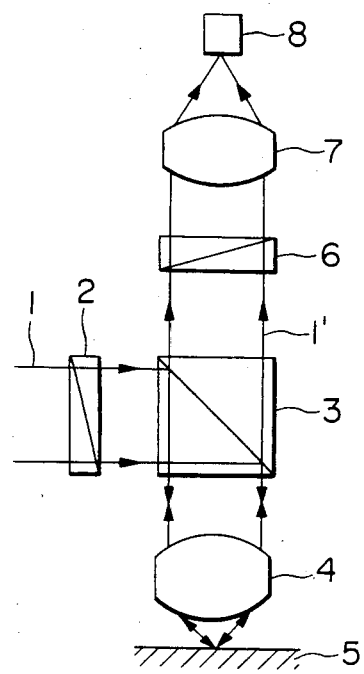
FIG. 1 is a schematic view showing an example of the magneto-optical information reading apparatus according to the prior art.
Figure 2:
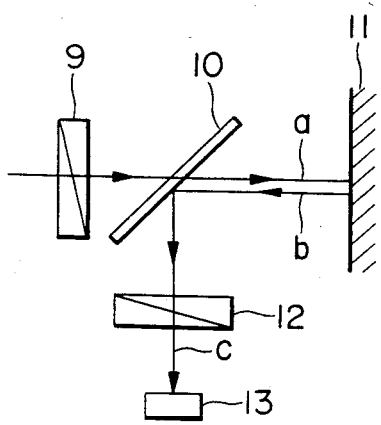
FIG. 2 is a schematic view showing an embodiment of the present invention.
Figure 3:
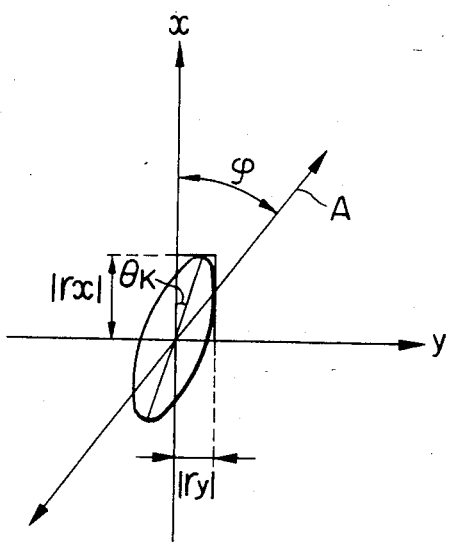
FIG. 3 shows the polarized state of the reflected light from a recording medium by the magneto-optic Kerr effect in the embodiment.

Referring to FIG. 2 which is a schematic view showing an embodiment of the magneto-optical information reading apparatus of the present invention, reference numeral 9 designates a polarizing plate, reference numeral 10 denotes a half mirror, reference numeral 11 designates a perpendicular magnetic recording medium, reference numeral 12 denotes an analyzer, and reference numeral 13 designates a photodetector having the current amplifying function. A linearly polarized light a having entered the perpendicular magnetic recording medium 11 magnetized in a certain direction is modulated by the magneto-optic Kerr effect and reflected as a reflected light b. The polarized state of the reflected light b is shown in FIG. 3. If the direction of Fresnel reflection polarization corresponding to the direction of polarization of the incident light a is the x-axis and the direction of Kerr effect reflection orthogonal to the x-axis created by the magneto-optic Kerr effect is the y-axis, the reflected light b becomes an elliptically polarized light having components of reflection coefficients $r_x$ and $r_y$ in which the major axis has been subjected to Kerr rotation by $\theta_K$ relative to the x-axis. The analyzer 12 has a transmission axis A exhibiting an aximuth $\phi$ relative to the x-axis as shown in FIG. 3, and the intensity I of the detected light C transmitted through the analyzer is $$I \propto |r_x|^2(\cos^2\phi + \eta\sin^2\phi) - |r_x||r_y|(1-\eta)\sin 2\phi \cos\delta \quad (1),$$

where $r_x = |r_x|e^{i\alpha}$, $r_y = |r_y|e^{i\beta}$, $\delta = \alpha - \beta$ and $\eta$ represents the extinction factor of the analyzer.

The first term of the right side of formula (1) is a DC component corresponding to the Fresnel reflected light from the recording medium, and the second term thereof is a signal AC component by the magneto-optic Kerr effect in the recording medium and the sign thereof is inverted correspondingly to the direction of magnetization of the recording medium (when the reflected light reflected by a portionn magnetized in a direction different from said direction of magnetization and subjected to Kerr rotation of $-\theta_K$ is transmitted through the analyzer 12) and the magnetic information stored in the recording medium can be read. In the present embodiment, as regards the azimuth of the transmission axis or the plane of polarization, for the sake of convenience, the clockwise direction is indicated by the positive sign and the counter-clockwise direction is indicated by the negative sign.

When the DC component is $I_R$ and the signal AC component is $I_K$, they can be expressed as follows from formula (1) by the use of the relation that $$\theta_K \simeq |r_y|\cos\delta/|r_x|:$$
$$I_R \propto |r_x|^2(\cos^2\phi + \eta\sin^2\phi) \quad (2)$$
$$I_K \propto |r_x|^2\theta_K(1-\eta)\sin 2\phi \quad (3)$$

The SN ratio of the reproduced signal after the detected light as described above has been photoelectrically converted by the photodetector differs depending on the type of the photodetector, namely, the presence of the current amplifying function, as previously described, and in the detection by the photodetector having no amplifying function such as PIN-photodiode, heat noise is generally dominant in the limited incident light power such as the magneto-optical detection and therefore, the reproduced SN ratio is proportional to said $I_K$. In contrast, in the detection by the photodetector 13 having the current amplifying function such as a photomultiplier tube or an avalanche diode (APD), as in the embodiment of FIG. 2, shot noise is generally dominant and therefore, the SN ratio (S/N) of the reproduced signal is $$(S/N) \propto I_K/\sqrt{I_R} \quad (4)$$

Further, in this reproduced SN ratio (S/N), the following dependence on the azimuth of the analyzer becomes apparent by the use of the formulas (2) and (3):

$$(S/N) \propto |r_x|\theta_K(1-\eta)\sin 2\phi/\sqrt{(\cos^2\phi + \eta\sin^2\phi)} \quad (5)$$

The analyzer 12 in the embodiment of FIG. 2 is set to the transmission axis aximuth $\phi$ which maximizes the (S/N) of formula (5) above.

Figure 4:
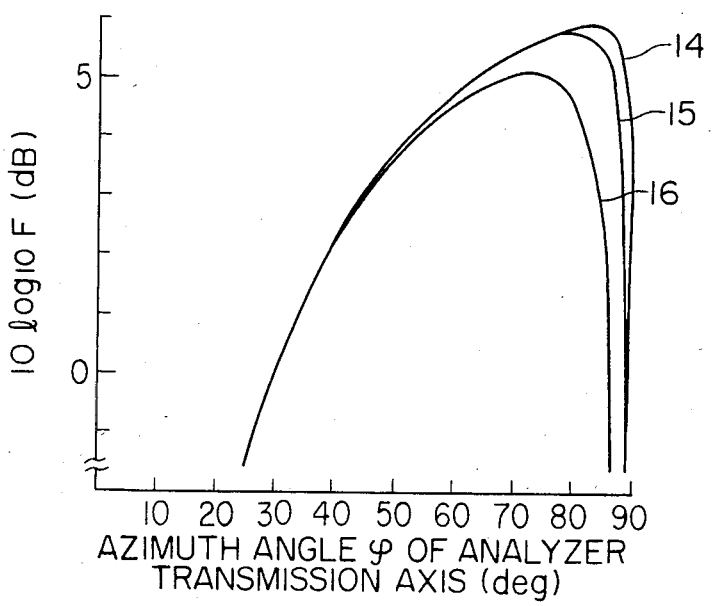
FIG. 4 is a graph showing the dependence on the azimuth of analyzer transmission axis of F exhibiting the SN ratio of a reproduced signal.

FIG. 4 is a graph in which $10\log_{10} F$ when $F = (1-\eta)^2\sin^2 2\phi/(\cos^2\phi + \eta\sin^2\phi)$ is plotted relative to the azimuth $\phi$ of the analyzer transmission axis. As is apparent from formula (5), the point at which this $10\log_{10} F$ is maximum is the optimum azimuth at which the reproduced SN ratio is maximum.

In FIG. 4, curves 14, 15 and 16 show the cases where the extinction factor of the analyzer is $10^{-4}$, $10^{-3}$ and $10^{-2}$. From this, it is seen that the optimum azimuth $\phi$opt. which maximizes F differs depending on the extinction factor $\eta$ of the analyzer. Depending on the extinction factor $\eta$ of the analyzer, the optimum azimuth opt. is given by $$\phi\text{opt.} = \pm\sin^{-1}\left(\frac{1}{\sqrt{1+\sqrt{\eta}}}\right) \quad (6)$$

and the then maximum value Fmax of F is $$F\text{max} = 4(1-\sqrt{\eta})^2. \quad (7)$$

As can be seen from FIG. 4, where use is made of a photodetector having the current amplifying function, by setting the analyzer transmission axis to the optimum azimuth $\phi$opt. as in the present invention, there is obtained a reproduced SN ratio greater by 2-3 (dB) than that in the conventional case where the azimuth of the analyzer is 45°.

The signs in equation (6) indicate the directions of inclination of the Fresnel reflection direction of the analyzer transmission axis relative to the direction of polarization. That is, in whichever direction the analzyer transmission axis is inclined relative to the direction of polarization, there can be obtained an entirely similar effect.

Figure 5:
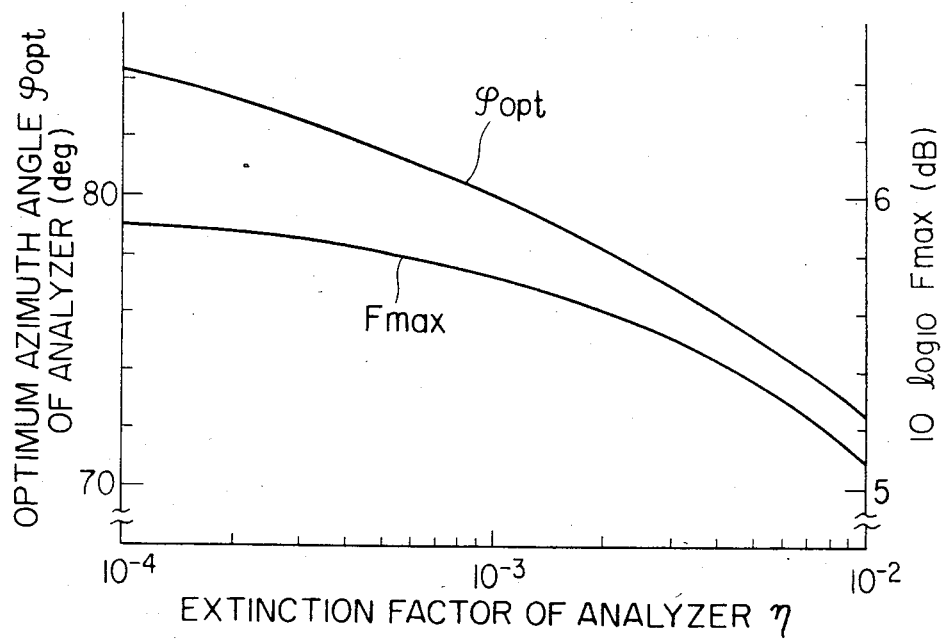
FIG. 5 is a graph showing the optimum azimuth of the analyzer of the present invention and the dependence of the then F on the extinction factor of the analyzer.

FIG. 5 shows the optimum azimuth $\phi$opt. of equations (6) and (7) above and the dependence of the then maximum value of Fmax of F on the extinction factor $\eta$ of the analyzer. From this, it is seen that in the range $(10^{-2}-10^{-4})$ of the extinction factor of a practical analyzer, the optimum azimuth $\phi$opt. exists in the range of 70°-85°. That is, the azimuth $\phi$ of the analyzer transmission axis in the present invention may be set to the optimum azimuth $\phi$opt. which provides a maximum reproduced SN ratio for the characteristic of the analyzer used in said range. Further, the influence of the extinction factor $\eta$ of the analyzer on the reproduced SN ratio when the azimuth is set to the optimum azimuth $\phi$opt. is 1 (dB) or less, and even the use of an inexpensive analyzer having an extinction factor of the order of $\eta \simeq 10^{-2}$ can provide a sufficiently great SN ratio, and this is convenient from the viewpoint of cost.

Figure 6:
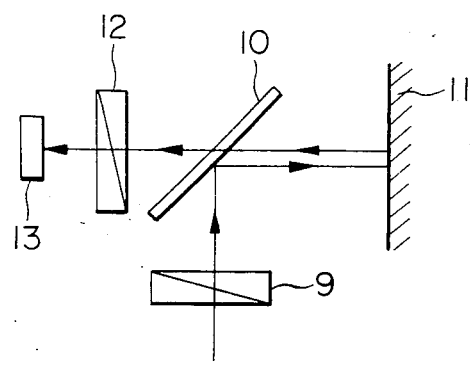
FIGS. 6, 7A and 7B are schematic views showing further embodiments of the present invention.
Figure 7A:
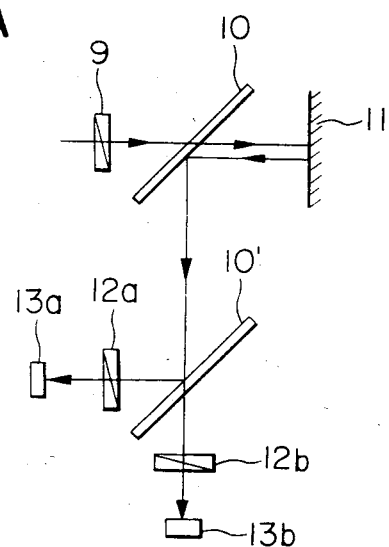
Figure 7B:
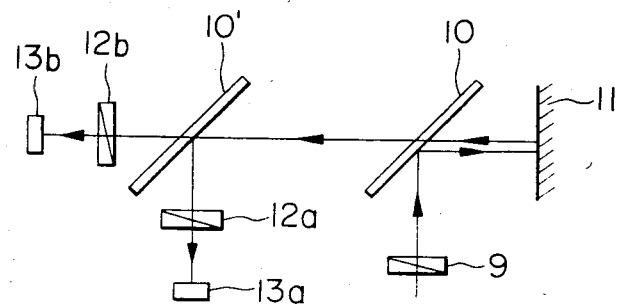

While the present invention has been described above with respect to the embodiment of FIG. 2, the present invention may adopt a construction as shown in FIG. 6. In FIG. 6, parts common to those in FIG. 2 are given similar reference numerals and need not be described in detail. The present invention is also usable for the differential type detection as shown in FIGS. 7A and 7B. The modulated light passed through the polarizing plate 9 and the half mirror 10 and reflected from the perpendicular magnetic recording medium 11 is divided by a half mirror 10' and the divided lights are transmitted through analyzers 12a and 12b and photoelectrically detected by photodetectors 13a and 13b each having the current amplifying function. In this case, the azimuths of the transmission axes of the analyzers 12a and 12b must be provided at the angle indicated by equation (6) above while being inclined in opposite directions relative to the direction of polarization of the Fresnel reflection direction for the purpose of differential detection.

While the above-described embodiment has been shown with respect to a case where the magneto-optic Kerr effect is used, the present invention is also applicable to a magneto-optical information reading apparatus using the Farady effect. In this case, the reflected light in the previously described embodiment may be replaced with a transmitted light, and an analyzer having its transmission axis set as previously described may be provided in the optical path of the light transmitted through the magnetic recording medium. Also, various other modifications may be made in the present invention without departing the scope thereof as defined in the appended claims.

What I claim is:

1. A magneto-optical information reading apparatus comprising:
   means for causing a light beam polarized in a predetermined direction to enter a magnetic recording medium on which information is recorded;
   an analyzer provided in the optical path of said light beam modulated by the magneto-optic effect in accordance with said information; and
   a photodetector having the current amplifying function and photoelectrically detecting the light beam transmitted through said analyzer;
   wherein the following equation is substantially satisfied:

$$\phi = \pm \sin^{-1}\left(\frac{1}{\sqrt{1+\sqrt{\eta}}}\right),$$

where $\phi$ is the transmission axis azimuth of said analyzer relative to said predetermined direction of polarization and $\eta$ is the extinction factor of said analyzer.

2. A magneto-optical information reading apparatus comprising:
   means for causing a light beam polarized in a predetermined direction to enter a magnetic recording medium on which information is recorded;
   dividing means for dividing said light beam modulated by the magneto-optic effect in acordance with said information;
   two analyzers provided in the optical paths of said divided light beams; and
   two photodetectors each having the current amplifying function and differentially detecting the light beams transmitted through said two analyzers;
   the transmission axes of said two analyzers being inclined in opposite directions relative to said predetermined direction of polarization;
   wherein the following equation is substantially satisfied:

$$\phi = \pm \sin^{-1}\left(\frac{1}{\sqrt{1+\sqrt{\eta}}}\right),$$

where $\phi$ is the azimuth of said transmission axes and $\eta$ is the extinction factor of said analyzers.

3. A magneto-optical information reading apparatus according to claim 1, wherein said transmission axis azimuth exists in the range of 70°–85°.

4. A magento-optical information reading apparatus according to claim 1, wherein said photodetector is a photomultiplier tube.

5. A magneto-optical information reading apparatus according to claim 1, wherein said photodetector is an avalanche photodiode.

6. A magneto-optical information reading apparatus according to claim 2, wherein said transmission axis azimuth exists in the range of 70°–85°.

7. A magneto-optical information reading apparatus according to claim 2, wherein said photodetectors are photomultiplier tubes.

8. A magneto-optical information reading apparatus according to claim 2, wherein said photodetectors are avalanche photodiodes.

* * * * *

UNITED STATES PATENT AND TRADEMARK OFFICE
CERTIFICATE OF CORRECTION

PATENT NO. : 4,569,035

DATED : February 4, 1986

INVENTOR(S) : YASUO TOMITA

It is certified that error appears in the above-identified patent and that said Letters Patent is hereby corrected as shown below:

Column 3, line 16, change "aximuth" to --azimuth--;
line 34, change "portionn" to --portion--; and
line 42, change "counter-clockwise" to --counterclockwise--.

Column 4, line 7, change "use of the forumulas" to --use of formulas--.

Column 5, line 30, change "Farady" to --Faraday--; and
line 38, change "departing the scope" to --departing from the scope--.

Column 6, line 17, change "acordance" to --accordance--.

Signed and Sealed this

Twentieth Day of January, 1987

Attest:

DONALD J. QUIGG

Attesting Officer  Commissioner of Patents and Trademarks